(12) United States Patent
Barocela et al.

(10) Patent No.: US 7,014,142 B2
(45) Date of Patent: Mar. 21, 2006

(54) LOW-DRAG ROTOR/WING FLAP

(75) Inventors: Edward Barocela, Ballwin, MO (US); Charles N. Vaporean, Ballwin, MO (US)

(73) Assignee: The Boeing Company, Chicago, IL (US)

( * ) Notice: Subject to any disclaimer, the term of this patent is extended or adjusted under 35 U.S.C. 154(b) by 234 days.

(21) Appl. No.: 10/770,764

(22) Filed: Feb. 3, 2004

(65) Prior Publication Data

US 2005/0224633 A1    Oct. 13, 2005

(51) Int. Cl.
B64C 27/22    (2006.01)
(52) U.S. Cl. .......................... 244/7 R; 244/7 A; 244/6; 244/39; 244/201; 244/213
(58) Field of Classification Search ................ 244/7 R, 244/7 A, 7 C, 17.11, 17.19, 23 B, 35 R, 39, 244/206, 211, 212, 214, 215
See application file for complete search history.

(56) References Cited

U.S. PATENT DOCUMENTS

| | | | |
|---|---|---|---|
| 1,878,775 A * | 9/1932 | Henry ........................ 244/215 |
| 2,249,026 A * | 7/1941 | Mourning et al. .......... 244/7 A |
| 2,257,215 A * | 9/1941 | Zap ............................. 244/215 |
| 3,195,836 A * | 7/1965 | Alvarez-Calderon ........ 244/216 |
| 3,652,036 A * | 3/1972 | Sans et al. ................. 244/53 B |
| 3,734,432 A * | 5/1973 | Low ............................. 244/191 |
| 3,794,273 A * | 2/1974 | Girard ........................ 244/7 A |
| 3,831,885 A * | 8/1974 | Kasper ........................ 244/199 |
| 3,934,533 A * | 1/1976 | Wainwright ............. 114/39.31 |
| 3,971,533 A * | 7/1976 | Slater ........................... 244/30 |
| 3,977,348 A * | 8/1976 | Bordat et al. ............... 114/280 |
| 4,022,546 A | 5/1977 | Drees et al. |
| 4,132,374 A * | 1/1979 | Abell .......................... 244/46 |
| 4,293,110 A * | 10/1981 | Middleton et al. .......... 244/199 |
| 4,314,795 A | 2/1982 | Dadone |
| 4,412,664 A | 11/1983 | Noonan |
| 4,459,083 A | 7/1984 | Bingham |
| 4,469,294 A | 9/1984 | Clifton |
| 4,569,633 A | 2/1986 | Flemming, Jr. |
| 4,610,410 A * | 9/1986 | Sibley ........................ 244/12.5 |
| 4,711,415 A * | 12/1987 | Binden ..................... 244/17.19 |
| 4,730,795 A * | 3/1988 | David ............................ 244/6 |
| 4,773,618 A | 9/1988 | Ow |
| 4,862,820 A * | 9/1989 | Guezou et al. ............. 114/278 |
| 4,895,323 A * | 1/1990 | May ............................ 244/214 |
| 4,998,689 A * | 3/1991 | Woodcock .................... 244/46 |
| 5,224,826 A | 7/1993 | Hall et al. |
| 5,236,149 A * | 8/1993 | MacKay ..................... 244/7 C |

(Continued)

Primary Examiner—Peter M. Poon
Assistant Examiner—S A Holzen
(74) Attorney, Agent, or Firm—Black Lowe & Graham, PLLC

(57) ABSTRACT

Rotor/wing aircraft having a low-drag flap are disclosed. In one embodiment, a rotor/wing aircraft includes an elongated blade having a body portion and a flap portion. The body portion has first and second edges and includes a non-symmetric portion proximate the second edge. The flap portion is moveably coupled to the body portion proximate the second edge and is moveable between a rotary flight position and a forward flight position. In the rotary flight position, the flap portion is proximate at least part of the non-symmetric portion to form a second symmetric portion proximate the second edge. In the forward flight position, the flap portion extends away from the non-symmetric portion to form a tapered portion proximate the second edge.

13 Claims, 4 Drawing Sheets

U.S. PATENT DOCUMENTS

| | | |
|---|---|---|
| 5,246,188 A | 9/1993 | Koutsoupidis |
| 5,454,530 A * | 10/1995 | Rutherford et al. ......... 244/7 A |
| 5,474,265 A * | 12/1995 | Capbern et al. ............ 244/214 |
| 5,609,472 A | 3/1997 | Obukata et al. |
| 5,680,124 A * | 10/1997 | Bedell et al. ............... 340/945 |
| 5,992,796 A * | 11/1999 | Smith ....................... 244/45 A |
| 6,168,379 B1 | 1/2001 | Bauer |
| 6,231,013 B1 | 5/2001 | Jaenker |
| 6,467,422 B1 * | 10/2002 | Elms .......................... 114/274 |
| 6,491,260 B1 * | 12/2002 | Borchers et al. ............ 244/199 |
| 6,601,795 B1 * | 8/2003 | Chen ........................... 244/46 |
| 6,669,137 B1 * | 12/2003 | Chen ......................... 244/7 R |
| 2002/0005455 A1 * | 1/2002 | Carter ............................ 244/8 |
| 2005/0001104 A1 * | 1/2005 | Arnaud ....................... 244/215 |

* cited by examiner

LOW-DRAG ROTOR/WING FLAP

FIELD OF THE INVENTION

The present disclosure relates to rotor/wing aircraft, and more specifically, to apparatus and methods for rotor/wing aircraft having a drag-reducing flap.

BACKGROUND OF THE INVENTION

Some aircraft are capable of both vertical and forward flight, including helicopters and other rotor/wing aircraft. Rotor/wing aircraft may have an aerodynamic lifting surface that rotates to provide lift during vertical flight, and remains fixed in a stationary position to provide lift during forward flight. Examples of such rotor/wing aircraft include those aircraft embodiments disclosed in U.S. Pat. No. 5,454,530 issued to Rutherford et al. The aerodynamic lifting surface of such rotor/wing aircraft typically has an airfoil cross-section that is symmetrically rounded on the leading and trailing edges so that the direction of airflow can be easily reversed when the aircraft transitions from rotary wing (or vertical) flight to fixed-wing (or forward) flight.

Although desirable results have been achieved using such prior art methods, there is room for improvement. For example, the rounded trailing edge of the symmetric airfoil section produces aerodynamic drag that degrades the performance of the aircraft. Thus, novel apparatus that may reduce the drag on the airfoil during either fixed-wing (forward) flight or rotary (vertical) flight would be useful and desirable.

SUMMARY OF THE INVENTION

The present invention is directed to apparatus and methods for rotor/wing aircraft having a low-drag flap. Apparatus and methods in accordance with the present invention may advantageously reduce the drag on the rotor/wing blades during forward and/or rotary flight. Furthermore, the lift of the rotor/wing blades may be improved with the flap deployed.

In one embodiment, a rotor/wing aircraft includes an elongated blade for generating aerodynamic lift having a body portion and a flap portion. The body portion has first and second edges and forms a first symmetric portion proximate the first edge and a non-symmetric portion proximate the second edge. The flap portion is moveably coupled to the body portion proximate the second edge and is moveable between a rotary flight position and a forward flight position. In the rotary flight position, the flap portion is proximate at least part of the non-symmetric portion to form a second symmetric portion proximate the second edge. In the forward flight position, the flap portion extends away from the non-symmetric portion to form a tapered portion proximate the second edge.

BRIEF DESCRIPTION OF THE DRAWINGS

The preferred and alternative embodiments of the present invention are described in detail below with reference to the following drawings.

DETAILED DESCRIPTION OF THE INVENTION

The present invention relates to apparatus and methods for rotor/wing aircraft having one or more drag-reducing flaps. Many specific details of certain embodiments of the invention are set forth in the following description and in FIGS. 1–8 to provide a thorough understanding of such embodiments. One skilled in the art, however, will understand that the present invention may have additional embodiments, or that the present invention may be practiced without several of the details described in the following description.

In general, embodiments of apparatus and methods in accordance with the present invention may include one or more drag-reducing flaps that may be deployed to reduce the drag on the blades of a rotor/wing aircraft during forward (fixed-wing) flight, vertical (rotary) flight, or both. In the following discussion, for the sake of clarity, embodiments of the invention will be described in terms of utilizing one or more drag-reducing flaps in the forward flight mode of operation only. Next, embodiments of the invention will be described in terms of utilizing drag-reducing flaps in both the forward and vertical flight modes of operation. It should be appreciated throughout the following discussion, however, that embodiments of apparatus and methods in accordance with the present invention may be used alternately in either the forward or vertical flight modes of operation, or both, and that the following description should not be viewed as limiting the described embodiments to any one particular operating mode.

Figure 1:
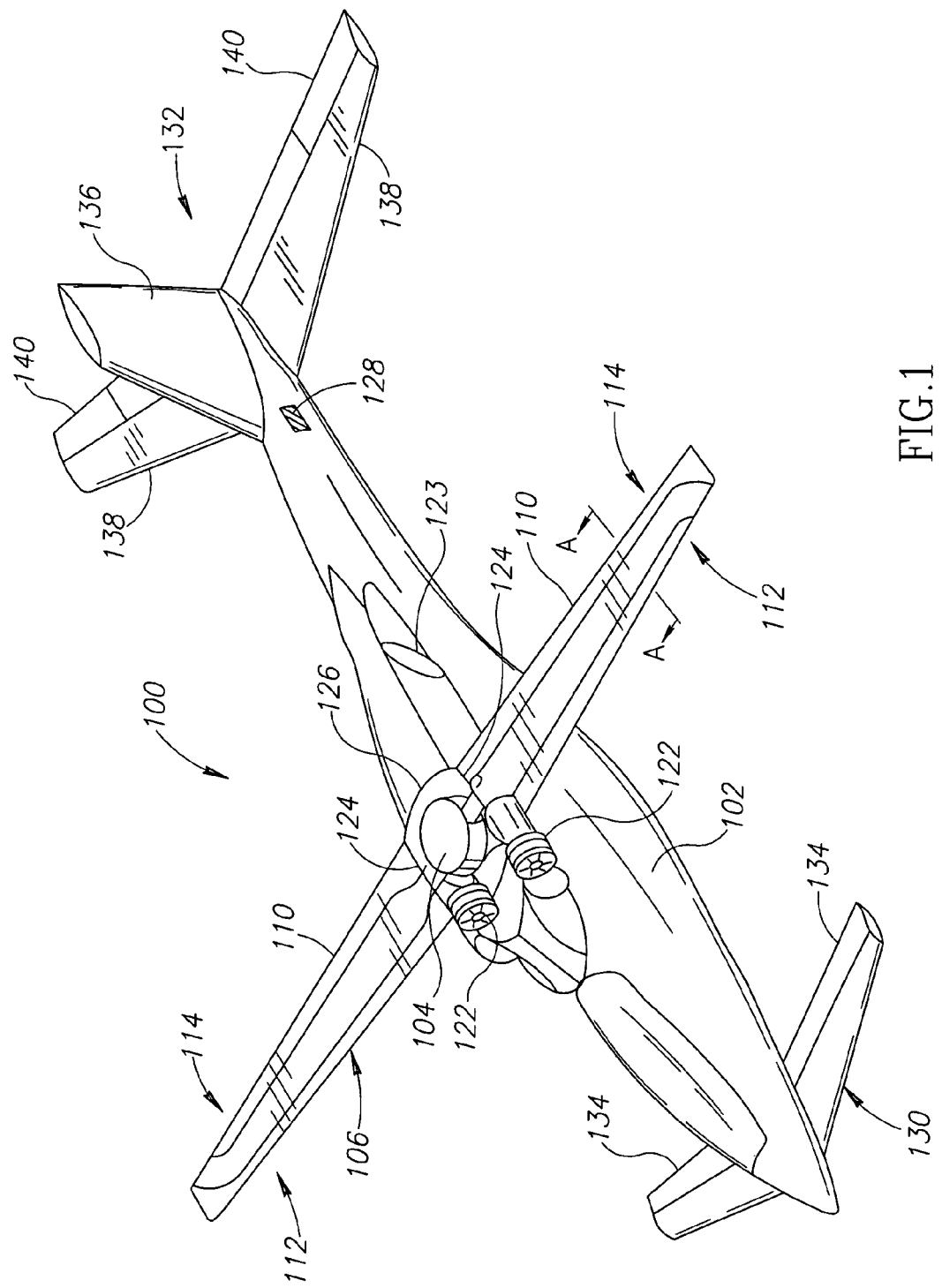
FIG. 1 shows a rotor/wing aircraft having a rotor/wing in accordance with an embodiment of the present invention.

FIG. 1 shows a rotor/wing aircraft 100 in accordance with an embodiment of the invention. In this embodiment, the aircraft 100 includes a fuselage 102, on which is rotatably mounted a rotor hub 104. Attached to the hub 104 is a rotor/wing 106 including a pair of blades 110 having first and second edges 112, 114. As described more fully below, in a rotating-rotor operating mode 116, the first and second edges 112, 114 of the blades 110 have symmetrically-shaped cross-sections, while in a fixed-wing, forward flight operating mode 118, a flap is deployed along at least a portion of the second edges 114, greatly improving the aerodynamic characteristics of the blades 110 during forward flight.

As further shown in FIG. 1, the rotor/wing aircraft 100 is powered by a pair of low bypass turbofan engines 122. Exhaust gases from the engines 122 are exhausted through nozzles 123. In order to control aircraft flight in the rotating rotor configuration 116, the rotor hub 104 may be of the gimbaled/teetering type in order to allow flapping degrees of freedom. A pair of feathering hinges 124 permit changing of the pitch of each rotor blade 110 as with a conventional helicopter. The rotor controls may include cyclic and collective pitch controllers of known construction contained within an aerodynamic hub fairing 126 that provide control capability in the rotating-rotor operating mode 116. Similarly, yaw control may be achieved through conventional helicopter control devices, such as a tail rotor, fenestron (or "fan-in-fin"), or a thruster 128.

The aircraft 100 further includes a canard 130 and a tail assembly 132 for controlling flight in the fixed wing operating mode 118. The canard 130 extends outwardly from each side of the fuselage 102, forwardly of the rotor/wing 106. The trailing edges of the canard 130 include flaperons 134. The tail assembly 132 is conventional with respect to other fixed wing aircraft, and includes a vertical tail portion 136 as well as two horizontal portions 138 extending outwardly from each side of the fuselage 102, rearwardly of the rotor/wing 106. Each of the horizontal portions 138 also includes a flaperon 140.

Figure 2:
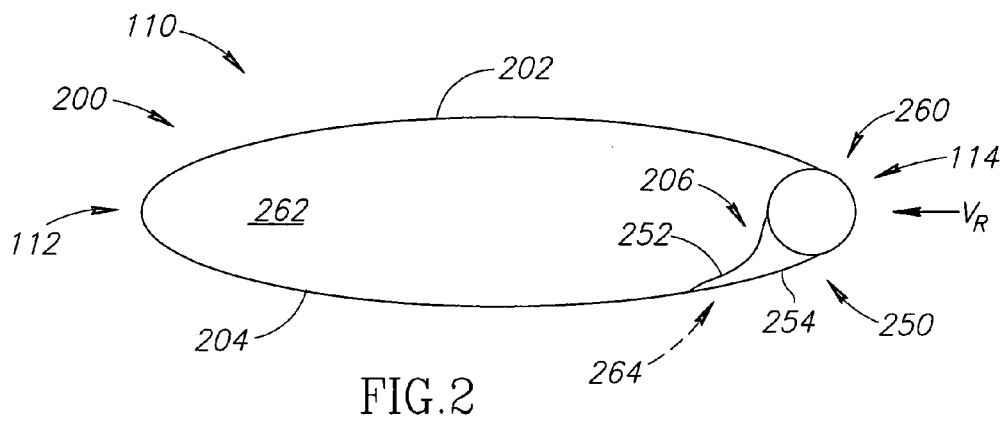
FIG. 2 shows an enlarged cross-sectional view of a blade of a rotor/wing of FIG. 1 with the drag-reducing flap in a vertical flight position.

FIG. 2 shows an enlarged cross-sectional view of one of the blades 110 of the rotor/wing 106 of FIG. 1 taken along line A—A. The blade 110 includes a body portion 200 having upper and lower surfaces 202, 204, and a flap portion 250 having first and second surfaces 252, 254 that is moveably coupled (e.g. hingeably coupled) to the body portion. The upper and lower surfaces 202, 204 of the body portion 200 form a first symmetrically-shaped airfoil portion section proximate the first edge 112 of the blade 110.

As further shown in FIG. 2, the flap portion 250 is positionable in a vertical (or rotary) flight position 260. In the vertical flight position 260, the flap portion 250 is stowed (e.g. by rotating) or otherwise positioned such that the first surface 252 of the flap portion 250 is positioned at least proximate to (or engaged into physical contact with) a recessed portion 206 of the lower surface 204. Thus, in the vertical flight position 260, the upper surface 202, and the combination of the lower and second surfaces 204, 254, form a substantially symmetrically-shaped airfoil section proximate the second edge 114 of the blade 110. In the rotating-rotor operating mode 116, the second edge 114 of the blade 110 is the so-called leading edge of the blade 110 upon which a freestream velocity $V_R$ impinges.

Figure 3:
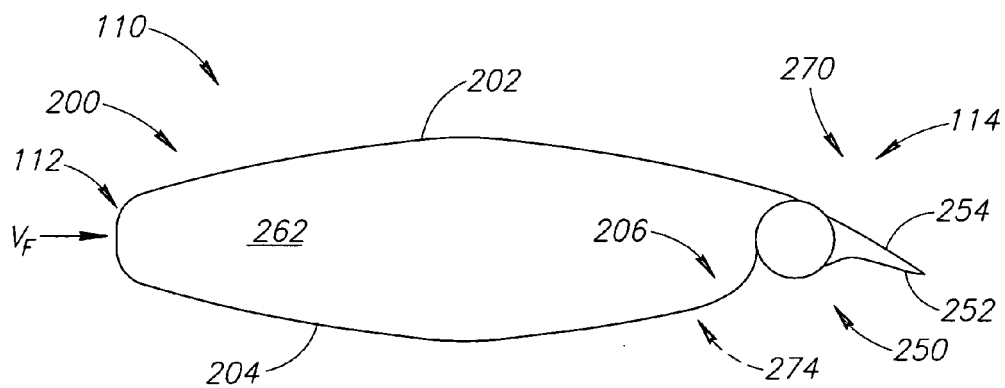
FIG. 3 shows an enlarged cross-sectional view of a blade of the rotor/wing of FIG. 1 with the drag-reducing flap in a forward flight position.

FIG. 3 shows an enlarged cross-sectional view taken along line A—A of the blade 110 of the rotor/wing 106 with the flap portion 250 positioned in a forward (or fixed-wing) flight position 270. In the forward flight position 270, the flap portion 250 is positioned such that the first surface 252 of the flap portion 250 is spaced-apart from the recessed portion 206 of the lower surface 204. In this embodiment, the second surface 254 of the flap portion 250 is substantially continuous with the upper surface 202 in the forward flight position 270. Thus, in the forward flight position 270, the cross-sectional shape of the blade 110 proximate the first edge 112 remains substantially symmetrical, while the cross-sectional shape of the blade 110 proximate the second edge 114 is not symmetrical, but rather, exhibits a generally tapered cross-sectional shape 274. As further shown in FIG. 3, in the forward flight operating mode 118, the first edge 112 of the blade 110 is the leading edge of the blade 110 upon which a freestream velocity $V_F$ impinges.

Rotor/wing aircraft having a blade that includes a flap portion in accordance with the present invention may have significant advantages over conventional rotor/wing aircraft. Because the flap portion may be stowed in the vertical flight position, the edge of the blade that includes the flap portion may form a symmetrically-shaped airfoil section suitable for the rotary flight mode of operation. With the flap portion deployed into the forward flight position, the edge of the blade becomes a non-symmetric, tapered airfoil section that is well-suited as a trailing edge for the forward flight mode of operation. More specifically, the blade having the flap portion positioned in the forward flight position in accordance with the present invention may advantageously provide reduced drag and improved lift characteristics in comparison with prior art rotor/wing blades having a relatively blunt, symmetrically-shaped trailing edge. Thus, rotor/wing aircraft that include flaps in accordance with the teachings of the present invention may exhibit improved aerodynamic performance, including improved payload capability, increased range, and reduced fuel consumption, in comparison with comparable prior art aircraft.

As noted above, it should be appreciated that the flap portion 250 may also be employed in the rotary (vertical) flight mode of operation. In the case of the embodiment shown in FIG. 3, for example, the flap portion 250 may be positioned in the deployed position 270 and the blade 200 may be rotated so that the first edge 112 is the leading edge and the second edge 114 is the trailing edge. Thus, the above-noted advantages of reduced drag and improved lift may also be achieved in rotary (vertical) flight.

Figure 4:
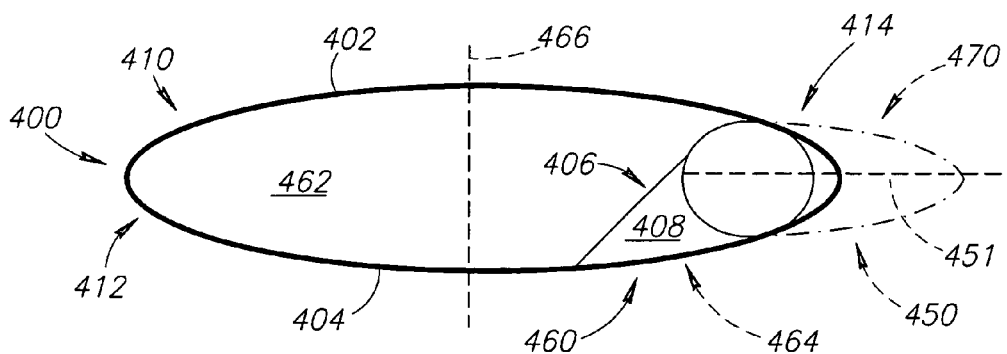
FIG. 4 shows an enlarged cross-sectional view a blade of a rotor/wing having a flap portion in accordance with an alternate embodiment of the present invention.

FIG. 4 shows an enlarged cross-sectional view a blade 400 of the rotor/wing 106 (FIG. 1) having a flap portion 450 in accordance with an alternate embodiment of the invention. As shown in FIG. 4, in this embodiment, the flap portion 450 is substantially symmetrically shaped about a plane of symmetry 451. The upper and lower surfaces 402, 404 of the body portion 410 form a substantially symmetrical portion 462 near the first edge 412 of the blade 400. As shown in FIG. 4, the lower surface 404 includes a recessed portion 406 that forms a substantially symmetrical pocket 408 into which the flap portion 450 is stowed in the rotary flight position 460. In the rotary flight position 460, the body portion 410 and the flap portion 450 together form a second substantially symmetrical portion 464 near the second edge 414 of the blade 400, the first and second symmetric portions 462, 464 being mirror-image symmetric portions about a plane of symmetry 466. Similarly, the flap portion 450 may be deployed in the forward flight position 470 to provide a generally tapered second edge 414 having reduced drag and improved lift in comparison with a conventional, symmetrically-shaped blade.

Figure 5:
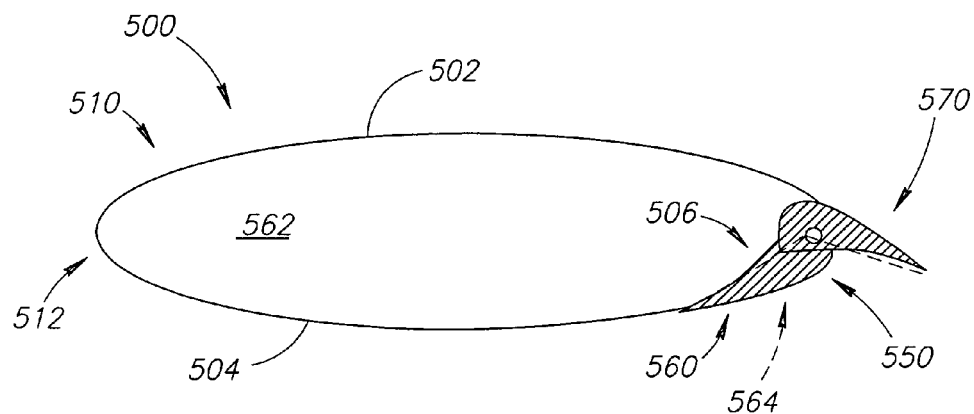
FIG. 5 shows an enlarged cross-sectional view a blade of a rotor/wing having a flap portion in accordance with another alternate embodiment of the present invention.
Figure 6:
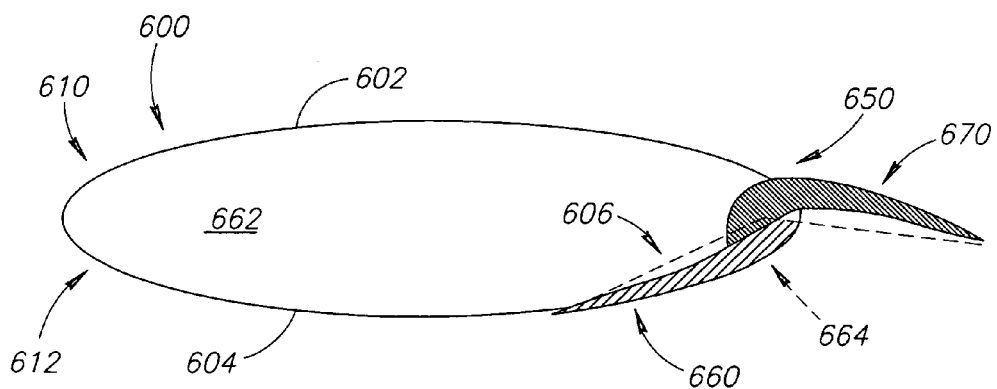
FIG. 6 shows an enlarged cross-sectional view a blade of a rotor/wing having a flap portion in accordance with still another alternate embodiment of the present invention.

FIGS. 5 and 6 show enlarged cross-sectional views of rotor/wing blades 500, 600 having flap portions 550, 650 in accordance with alternate embodiments of the present invention. In these alternate embodiments, the flap portions 550, 650 have varying sizes and degrees of camber in comparison with the previously described embodiments. Similarly, the lower surfaces 504, 604 of the body portions 510, 610 have correspondingly different recessed portions 506, 606 that are adapted to receive the flap portions 550, 650 in the stowed or vertical flight position. Each blade 500, 600 includes an upper surface 502, 602 and a lower surface 504, 604 that form a substantially symmetrical portion 562, 662 near the first edge 512, 612 of the body portion 510, 610, respectively. Similarly, each lower surface 504, 604 includes a recessed portion 506, 606 that forms a pocket into which the flap portion 550, 650 is stowed in the rotary flight position 560, 660 to form a second substantially symmetrical portion 564, 664 near the second edge 514, 614, in the manner described above. As shown in FIGS. 5 and 6, the flap portions 55, 650 may be deployed in the forward flight position 570, 670 to provide reduced drag and improved lift in comparison with conventional, symmetrically-shaped blades.

Again, it should be noted that the flap portions of the embodiments shown in FIGS. 4–6 may be employed in the rotary (vertical) flight mode of operation. Thus, the above-noted advantages of reduced drag and improved lift may also be achieved in rotary (vertical) flight using the embodiments shown in FIGS. 4–6.

Figure 7:
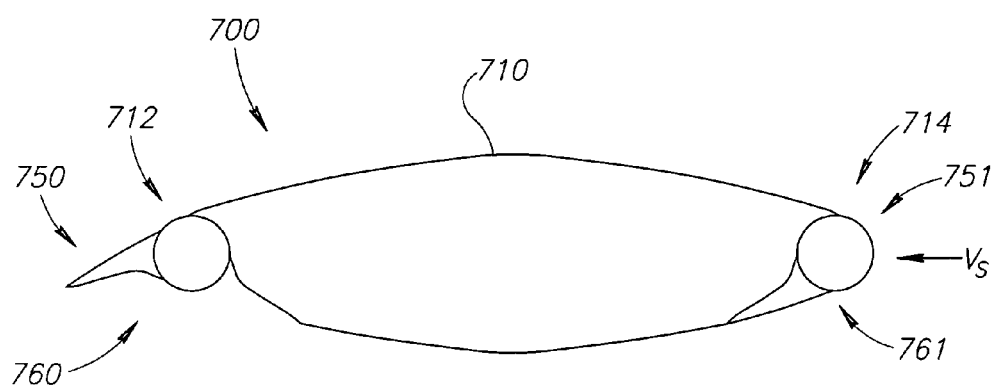
FIG. 7 shows an enlarged cross-sectional view a blade of a rotor/wing having first and second flap portions in a first flight position in accordance with a further embodiment of the present invention.
Figure 8:
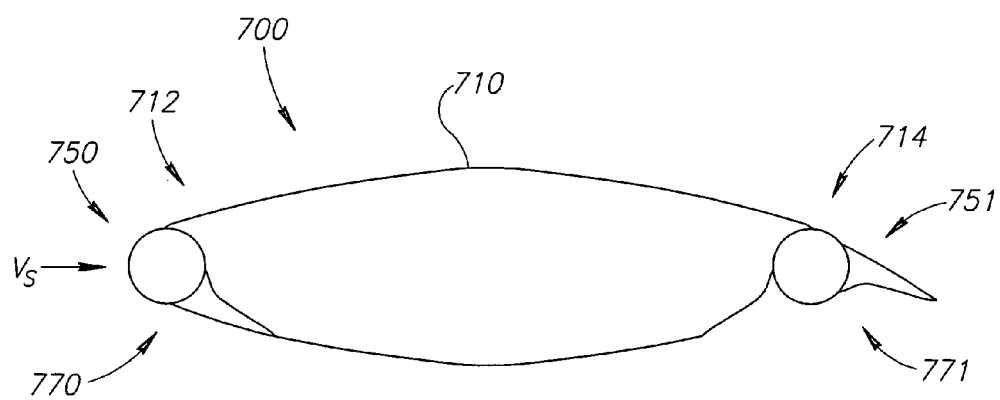
FIG. 8 shows an enlarged cross-sectional view the blade of FIG. 7 in a second flight position in accordance with another embodiment of the present invention.

It will also be appreciated that alternate embodiments may be conceived that include a plurality of drag-reducing flap portions distributed over the same edge (i.e. leading or trailing edge) or over opposite edges of the blade. For example, FIGS. 7 and 8 show enlarged cross-sectional views of a blade having first and second flap portions in first and second flight positions, respectively. In this embodiment, a blade 700 of a rotor/wing aircraft 100 (FIG. 1) includes first and second flap portions 750, 751 positioned on first and second edges 712, 714 of the body portion 710, respectively. In FIG. 7, the first flap portion 750 is positioned in a deployed position 760 and the second flap portion 751 is positioned in a stowed position 761. Thus, in the position shown in FIG. 7, the blade 700 is suitably configured for operation with the second edge 114 as the leading edge (in either the vertical or forward flight operating modes) such that the freestream velocity $V_s$ impinges on the second edge 114. Similarly, in FIG. 8, the first flap portion 750 is positioned in a deployed position 770 and the second flap portion 751 is positioned in a deployed position 771 so that the blade 700 is suitably configured for operation with the first edge 112 as the leading edge (in either the vertical or forward flight operating modes). Thus, the above-noted advantages of reduced drag and improved lift may be achieved using an embodiment of a blade having drag-reducing flaps on both the leading and trailing edges that may be alternately deployed and stowed as desired depending upon the flight operating mode.

It should be understood that the invention is not limited to the particular embodiments of blade cross-sectional shapes, including body portions and flap portions, described above and shown in the accompanying figures, and that a wide variety of blade cross-sectional shapes may be conceived in accordance with the teachings of the present disclosure. More specifically, a wide variety of flap portions may be conceived having differing degrees of camber, aspect (thickness over chord) ratio, size, point of connection to the body portion, or other desired design parameters, and that vary from the representative flap portions shown in the accompanying figures, and a corresponding number of body portions may be conceived to cooperate with the flap portions in accordance with the teachings herein. Generally, it will be appreciated that possible embodiments of flap portions that may be employed in accordance with the present invention include those airfoil cross-sectional shapes disclosed, for example, in Aerospace Vehicle Design, Vol. I, written by K. D. Wood and published by Johnson Publishing Company of Boulder, Colo.

It will also be appreciated that a wide variety of rotor/wing aircraft may be conceived that include rotor/wing blades having a moveable flap portion in accordance with alternate embodiments of the present invention, and that the invention is not limited to the particular rotor/wing aircraft embodiment described above and shown in FIG. 1. The inventive apparatus disclosed herein may be employed in any other type of rotor/wing aircraft having an aerodynamic lifting surface that rotates to provide lift during a vertical flight mode, and remains fixed in a stationary position to provide lift during a forward flight mode, including, for example, those manned and unmanned rotor/wing aircraft shown and described in Jane's All the World's Aircraft published by Jane's Information Group of Coulsdon, Surrey, United Kingdom, and The Illustrated Encyclopedia of Military Aircraft written by Enzo Angelucci and published by Book Sales Publishers, Inc.

While preferred and alternate embodiments of the invention have been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method of operating an aircraft, comprising:
    providing a plurality of elongated blades operatively coupled to a fuselage, a first one of the elongated blades including a body portion and a flap portion, the body portion having first and second edges and forming a non-symmetric portion proximate the second edge, the flap portion being moveably coupled to the body portion proximate the second edge;
    positioning the flap portion in a rotary flight position wherein the flap portion is proximate at least part of the non-symmetric portion such that the non-symmetric portion and the flap portion combine to form a symmetric portion proximate the second edge;
    generating lift in a vertical flight mode of operation including rotating the blade with the flap portion in the rotary flight position such that the second edge is a leading edge of the blade;
    positioning the flap portion in a forward flight position wherein the flap portion extends away from the non-symmetric portion of the body portion to form a tapered portion proximate the second edge; and
    generating lift in a forward flight mode of operation including fixing the blade in a stationary position with the flap portion in the forward flight position.

2. The method of claim 1, wherein providing an elongated blade including a body portion and a flap portion includes providing an elongated blade including an asymmetric flap portion.

3. The method of claim 1, wherein providing an elongated blade including a body portion and a flap portion includes providing an elongated blade having a body portion that includes upper and lower surfaces coupled together along the first and second edges, and a flap portion that includes first and second surfaces, and wherein positioning the flap portion in a rotary flight position includes positioning the first surface of the flap portion proximate at least part of the lower surface.

4. The method of claim 3, wherein positioning the flap portion in a rotary flight position includes positioning a concave portion of the first surface proximate a convex portion of the lower surface.

5. The method of claim 3, wherein positioning the flap portion in a rotary flight position includes positioning the flap portion at least partially within a recessed portion of the lower surface.

6. The method of claim 1, wherein generating lift in a forward flight mode of operation further includes propelling the elongated blade in a forward direction.

7. A method of operating an aircraft, comprising:
    providing a plurality of elongated blades moveably coupled to a fuselage, a first one of the elongated blades including a body portion having first and second edges and forming a non-symmetric portion proximate at least one of the first and second edges, and a flap portion moveably coupled to the body portion proximate the non-symmetric portion;

positioning the flap portion in a stowed position wherein the flap portion is proximate at least part of the non-symmetric portion such that the non-symmetric portion and the flap portion combine to form an at least approximate symmetric portion;

generating lift in a first operating mode including moving the blade such that the approximately symmetric portion is proximate a leading edge of the blade;

positioning the flap portion in a deployed position wherein the flap portion extends away from the non-symmetric portion; and generating lift in a second operating mode including moving the blade such that the flap portion is proximate a trailing edge of the blade.

8. The method of claim 7, wherein generating lift in a first operating mode includes rotating the blade relative to the fuselage such that the approximately symmetric portion is proximate a leading edge of the blade.

9. The method of claim 7, wherein generating lift in a first operating mode includes fixing a position of the blade relative to the fuselage and propelling the elongated blade in a forward direction such that the approximately symmetric portion is a leading edge of the blade.

10. The method of claim 7, wherein the flap portion is a first flap portion, the method further comprising providing a second flap portion moveably coupled to the body portion proximate a second non-symmetric portion of the body portion, the second flap portion being positionable in a stowed position proximate at least part of the second non-symmetric portion such that the second non-symmetric portion and the second flap portion combine to form a second at least approximately symmetric portion, and in a deployed position wherein the second flap portion extends outward from the body portion.

11. The method of claim 10, wherein the first flap portion is moveably coupled to the first edge of the body portion and the second flap portion is moveably coupled to the second edge of the body portion.

12. The method of claim 10, wherein generating lift in the second operating mode includes positioning the second flap portion in the stowed position.

13. The method of claim 10, wherein generating lift in the first operating mode includes positioning the second flap portion in the deployed position.

* * * * *